(12) United States Patent
Kato et al.

(10) Patent No.: US 6,301,663 B1
(45) Date of Patent: Oct. 9, 2001

(54) COPY PROTECTION APPARATUS AND INFORMATION RECORDING MEDIUM USED IN THIS COPY PROTECTION APPARATUS

(75) Inventors: Taku Kato, Kamakura; Takehisa Kato, Yokohama; Kenjiro Endoh, Tokyo; Hisashi Yamada, Yokohama; Naoki Endoh, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/195,918

(22) Filed: Nov. 19, 1998

(30) Foreign Application Priority Data

Nov. 20, 1997 (JP) .................................................. 9-361980
Nov. 13, 1998 (JP) ................................................ 10-323879

(51) Int. Cl.$^7$ ....................................................... H04L 9/00
(52) U.S. Cl. ........................ 713/176; 380/201; 380/203; 380/210
(58) Field of Search .................................. 380/201, 203, 380/210; 713/176

(56) References Cited

U.S. PATENT DOCUMENTS

| | | | |
|---|---|---|---|
| 5,613,004 | * 3/1997 | Cooperman et al. | 380/28 |
| 5,905,800 | * 5/1999 | Moskowitz et al. | 380/28 |
| 6,131,161 | * 10/2000 | Linnartz | 713/176 |
| 6,141,753 | * 10/2000 | Zhao et al. | 713/176 |

* cited by examiner

*Primary Examiner*—Thomas R. Peeso
*Assistant Examiner*—Todd Jack
(74) *Attorney, Agent, or Firm*—Finnegan, Henderson, Farabow, Garrett & Dunner, L.L.P.

(57) ABSTRACT

This invention protects the unauthorized copy of multimedia data, recorded on an information recording medium, by using electronic watermark information and key information. The electronic watermark information embedded in the multimedia data is extracted by an electronic watermark extraction unit on the decryption system side. A disk key is obtained using the electronic watermark information and a part master key. The multimedia data is decrypted using the resultant disk key.

10 Claims, 10 Drawing Sheets

# COPY PROTECTION APPARATUS AND INFORMATION RECORDING MEDIUM USED IN THIS COPY PROTECTION APPARATUS

BACKGROUND OF THE INVENTION

The present invention relates to a copy protection apparatus for preventing digital data recorded on a recording medium from an unauthorized copy from the recording medium. The present invention also relates to an information recording medium used in this copy protection apparatus.

Conventional multimedia information (e.g., image and audio data) recording media are developed in the form of a floppy disk, compact disk, DVD (Digital Video Disk), or the like.

Since digital data is recorded directly (compressed and coded data which can be decoded are also included) on the various types of digital recording media described above, the recorded data can be easily copied to other media without any loss, thus suffering problems such as copyright infringement.

To solve these problems, a method of encryption digital data and recording the encrypted digital data on a recording medium is available. However, deficiencies in management of encryption keys used in encrypting the recorded data inevitably allow data copy.

BRIEF SUMMARY OF THE INVENTION

The present invention has been made in consideration of the above situation, and has as its object to provide a copy protection apparatus for preventing digital data recorded on a recording medium from an unauthorized copy from the recording medium.

It is another object of the present invention to provide an information recording medium used in this copy protection apparatus.

In order to achieve the above objects according to the first aspect of the present invention, there is provided a copy protection apparatus comprising:

an encryption system; and
a decryption system connected to the encryption system via a CPU bus,
wherein the encryption system comprises
   first encryption means for encrypting, using a shared encryption key shared by the encryption system and the decryption system, an encrypted disk key encrypted using a disk key itself,
   first transmission means for transmitting, via the CPU bus, the disk key encrypted by the first encryption means,
   second encryption means for encrypting, using the shared encryption key, the encrypted disk key encrypted using the master key,
   second transmission means for transmitting, via the CPU bus, the disk key encrypted by the second encryption means,
   third encryption means for encrypting, using the shared encryption key, multimedia data in which electronic watermark information serving as some of the master keys is embedded,
   third transmission means for transmitting, via the CPU bus, the multimedia data encrypted by the third encryption means, and
   fourth transmission means for transmitting the multimedia data encrypted using the disk key, and the decryption system comprises
   first decryption means for decrypting, using the shared encryption key, the disk key transmitted from the first transmission means,
   second decryption means for decrypting, using the shared encryption key, the disk key transmitted from the second transmission means,
   third decryption means for decrypting, using the shared encryption key, the multimedia data transmitted from the third transmission means,
   extraction means for extracting the watermark information from the multimedia data decrypted by the third decryption means,
   disk key acquisition means for acquiring the disk key on the basis of the disk key decrypted by the first decryption means, the disk key decrypted by the second decryption means, the watermark information extracted by the extraction means, and a part master key corresponding to some of the master keys, and
   fourth decryption means for decrypting, using the disk key acquired by the disk key acquisition means, the multimedia data transmitted from the fourth transmission means.

According to the second aspect of the present invention, there is provided a copy protection apparatus according of the first aspect, wherein the disk key acquisition means comprises:

first acquisition means for acquiring a master key candidate on the basis of the part master key and the watermark information;
second acquisition means for acquiring, using the master key candidate acquired by the first acquisition means, a first disk key candidate by decrypting the disk key decrypted by the second decryption means;
third acquisition means for acquiring, using the first disk key candidate acquired by the second acquisition means, a second disk key candidate by decrypting the disk key decrypted by the first decryption means;
determination means for determining whether the first disk key candidate acquired by the second acquisition means coincides with the second disk key candidate acquired by the third acquisition means; and
decision means for deciding the first disk key candidate as the disk key when the determination means determines that the first disk key candidate coincides with the second disk key candidate.

According to the third aspect of the present invention, there is provided a copy protection apparatus comprising:

an encryption system; and
a decryption system connected to the encryption system via a CPU bus,
wherein the encryption system comprises
   first encryption means for encrypting, using a shared encryption key shared by the encryption system and the decryption system, an encrypted disk key encrypted using a disk key itself,
   first transmission means for transmitting, via the CPU bus, the disk key encrypted by the first encryption means,
   second encryption means for encrypting, using the shared encryption key, the encrypted disk key encrypted using the master key,
   second transmission means for transmitting, via the CPU bus, the disk key encrypted by the second encryption means, third transmission means for transmitting, via the CPU bus, the multimedia data which is decrypted by the disk key and in which electronic watermark information serving as some of the master keys is embedded, and fourth transmission means for transmitting the multimedia data encrypted using the disk key and the watermark information, and the decryption system comprises first decryption means for decrypting, using the shared encryption key, the disk key transmitted from the first transmission means, second decryption means for decrypting, using the shared encryption key, the disk key transmitted from the second transmission means, disk key acquisition means for acquiring the disk key on the basis of the disk key decrypted by the first decryption means, the disk key decrypted by the second decryption means, the watermark information extracted by the extraction means, and a part master key corresponding to some of the master keys, third decryption means for decrypting, using the disk key acquired by the disk key acquisition means, the multimedia data transmitted from the third transmission means, extraction means for extracting the electronic watermark information from the multimedia data decrypted by the third decryption means, and fourth decryption means for decrypting the multimedia data from the fourth transmission means on the basis of the electronic watermark information extracted by the extraction means and the disk key acquired by the disk key acquisition means.

According to the fourth aspect of the present invention, there is provided a copy protection apparatus comprising:

an encryption system; and a decryption system connected to the encryption system via a CPU bus, wherein the encryption system comprises first encryption means for encrypting, using a shared encryption key shared by the encryption system and the decryption system, an encrypted disk key encrypted using a disk key itself, first transmission means for transmitting, via the CPU bus, the disk key encrypted by the first encryption means, second encryption means for encrypting, using the shared encryption key, the encrypted disk key encrypted using the master key, second transmission means for transmitting, via the CPU bus, the disk key encrypted by the second encryption means, third transmission means for transmitting, via the CPU bus, the multimedia data which is decrypted by the disk key and in which electronic watermark information serving as some of the master keys is embedded, and fourth transmission means for transmitting, via the CPU bus, the multimedia data which is encrypted by the disk key and on which the electronic watermark information is superposed, and the decryption system comprises first decryption means for decrypting, using the shared encryption key, the disk key transmitted from the first transmission means, second decryption means for decrypting, using the shared encryption key, the disk key transmitted from the second transmission means, disk key acquisition means for acquiring the disk key on the basis of the disk key decrypted by the first decryption means, the disk key decrypted by the second decryption means, the watermark information extracted by the extraction means, and a part master key corresponding to some of the master keys, third decryption means for decrypting, using the disk key acquired by the disk key acquisition means, the multimedia data transmitted from the third transmission means, extraction means for extracting the electronic watermark information from the multimedia data decrypted by the third decryption means, fourth decryption means for decrypting, using the disk key acquired by the disk key acquisition means, the multimedia data transmitted from the fourth transmission means, and fifth decryption means for decrypting, using the electronic watermark information extracted by the extraction means, the multimedia data decrypted by the fourth decryption means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In this embodiment, operation of encrypting given data a using a key K is expressed as Ek(a), while operation of decrypting the given data a using the key K is expressed as Dk(a). By using these expressions, operation of encrypting the given data a and decrypting it using the key K is expressed as Dk(Ek(a)).

This embodiment will exemplify a system for reproducing audio data compressed and coded in accordance with the data compression standards called MPEG-Audio and recorded on a DVD.

In this embodiment, a plurality of master keys are prepared, and one or more master keys are assigned to each predetermined unit such as a decryption system maker (or DVD manufacturer or sales company).

<First Embodiment>

The first embodiment of the present invention will be described below.

Figure 1:
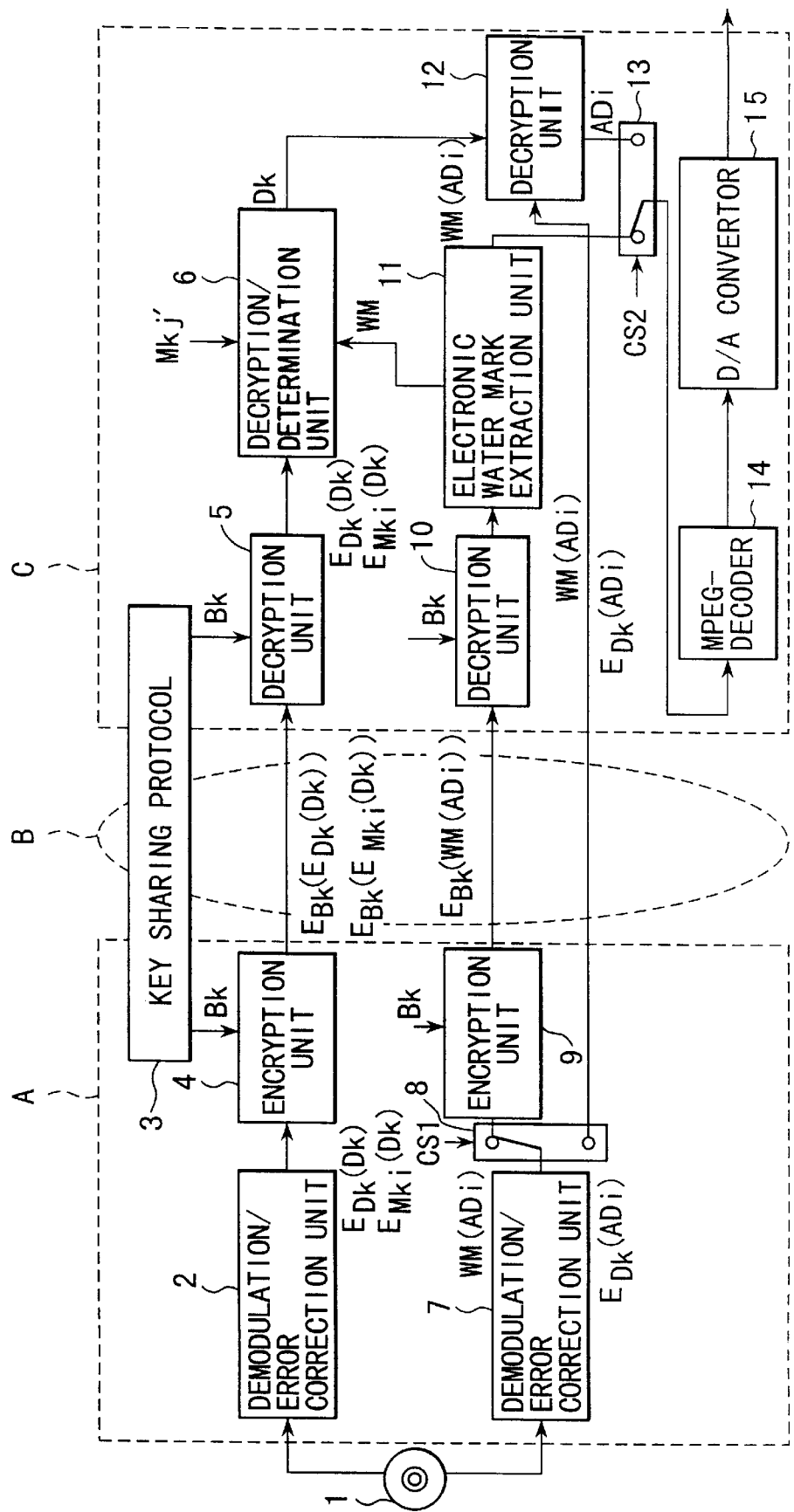
FIG. 1 is a block diagram showing a copy protection apparatus according to the first embodiment of the present invention.

FIG. 1 is a block diagram showing a copy protection apparatus according to the first embodiment of the present invention.

A system of this embodiment is connected to a so-called CPU bus of a playback CPU arranged in a computer such as a personal computer (to be referred to as a PC hereinafter), and encrypted data flows on the CPU bus. Note that only part associated with the playback CPU is illustrated in FIG. 1.

As shown in FIG. 1, the copy protection apparatus of this embodiment comprises an encryption system A and a decryption system C. The encryption and decryption systems A and C may be arranged in a DVD drive unit for reading data from a DVD 1. Alternatively, the systems A and C may be connected directly to the DVD drive unit without being through the CPU bus.

The encryption and decryption systems A and C are connected to a CPU bus B. Data from the decryption system C is output via, e.g., an I/O port except the CPU bus B. More specifically, in this embodiment, data is input/output without being through the CPU bus B, but data is transferred between the systems A and C using the CPU bus B.

The encryption system A comprises demodulation/error correction units 2 and 7, encryption units 4 and 9, and a control switch 8. The control switch 8 receives a control signal (CS1) for transferring the data to the encryption unit 9 when the first processing data sequence is input. Otherwise, the control switch 8 receives a control signal (CS1) for outputting the data directly to the CPU bus B.

Referring to FIG. 1, the two encryption units 4 and 9 are illustrated in the encryption system A. However, one encryption unit can constitute these encryption units in practice.

The encryption system A is formed as one independent IC chip.

The decryption system C comprises decryption units 5, 10, and 12, a master key decryption/determination unit 6, an electronic watermark extraction unit 11, and a control switch 13.

The control switch 13 receives a control signal (CS2) for receiving a signal from electronic watermark extraction unit 11 as an input signal when the first processing data sequence is input. Otherwise, the control switch 13 receives a control signal (CS2) for receiving a signal from the decryption unit 12 as an input signal.

The decryption system C also comprises an MPEG-Decoder 14 and a D/A converter 15 for converting the decoded digital audio data into analog audio data.

Referring to FIG. 1, the four decryption units 5, 6, 10 and 12 are illustrated in the decryption system C. One decryption unit can constitute these four decryption units in practice. The decryption system C is formed into one independent IC chip.

Some of master keys to be described later are registered (stored) in the decryption system C. The master keys are recorded in a secret area in the chip so as not to allow a user to externally obtain them or intentionally read out them from the chip of the decryption system C.

The following several methods are available to set the number of types of keys $E_{Mki}(Dk)$ recorded on the DVD 1 and generated by encrypting the disk key using master keys Mki and the number of types of part master keys Mkj' in the decryption system C.

(Method 1)

A disk key $E_{Mki}(Dk)$ (i=1 to n) encrypted by one master key having i as one of 1 to n is recorded on the DVD 1. N part master keys Mkj' corresponding to all keys j (i=1 to n) are stored in the decryption system C.

(Method 2)

Disk keys $E_{Mki}(Dk)$ encrypted by all n master keys corresponding to all the keys i (i=1 to n) are recorded on the DVD 1. A part master key Mkj' corresponding to one of the keys j (j=1 to n) is stored in the decryption system C.

(Method 3)

Method 3 is an extension of Method 2. Disk keys $E_{Mki}(Dk)$ encrypted by n master keys corresponding to all the keys i (j=1 to n) are recorded on the DVD 1. M (2<m<n) part master keys Mkj' preselected from all the keys j (j=1 to n) are stored in the decryption system C.

(Method 4)

The keys recorded on the DVD 1 and the decryption system C are reversed in Method 3. Disk keys $E_{Mki}(Dk)$ encrypted by the m (2<m<n) master keys preselected from all the keys i (i=1 to n) are recorded on the DVD 1. N part master keys Mkj' corresponding to all keys j (j=1 to n) are stored in the decryption system C.

(Method 5)

Disk keys $E_{Mki}(Dk)$ encrypted by n master keys corresponding to all keys i (i=1 to n) are recorded on the DVD 1. N part master keys Mkj' corresponding to all the keys j (j=1 to n) are also stored in the decryption system C.

Partial key information WM embedded as a watermark and the computation of the master key decryption/determination unit 6 are also changed by the above method.

The encryption key/decryption key used as cryptographic communication performed through the CPU bus B is a key Bk based on the based on the common key. A method of sharing the encryption key between the encryption system A and the decryption system C is the same as the conventional method.

A controller (not shown) controls the overall operation. For example, the controller can be realized by causing the CPU of the computer to execute a program. Examples of control of this controller are designation associated with a data read from the DVD 1, designation of data transfer destination, designation associated with data output from the decryption system, and the like.

The controller is triggered by a user through a user interface or by a process in a given application program.

In this embodiment, a digital source audio data sequence, an audio data sequence (compressed data sequence), and audio data in which data of some of the master keys is embedded as an electronic watermark are represented by D-Audio, AD={AD1, AD2, . . . , ADi, . . . }, and WM(ADi), respectively.

Depending on audio data sequences AD, copy control electronic watermark information may be embedded in addition to the embedded electronic watermark information. Let Bk, Dk, {Mk1, Mk2, . . . , Mki, . . . , Mkn}, and {Mk1', Mk2', . . . , Mkj', . . . , Mkm'} be the encryption key (to be referred to as a shared encryption key) shared between the encryption and decryption systems, the encryption key (disk key) for encrypting the audio data sequence, the bunch of n encryption keys (master keys) for encrypting the disk key, and the bunch of part master keys registered in the decryption system, respectively.

Note that the part master key is a key corresponding to m keys of the n master keys. Each part master key is data prepared so as to obtain a master key by performing a certain computation between the data extracted from WM(ADi).

$E_{Dk}(Dk)$ represents a disk key generated by encryption using the disk key itself. $\{E_{Mki}(Dk)\ (i=1. . . , n)\}$ represents disk keys generated by encryption using the n master keys. WM(ADi) represents audio data ADi generated by embedding data of some of the master keys by using an electronic watermark technique. $E_{Dk}(ADi)$ represents audio data generated by encryption using the disk key Dk. $E_{Bk}(E_{Dk}(Dk))$ represents the disk key itself encrypted using the disk key generated by encryption using the shared encryption key Bk. $E_{Bk}(E_{Mki}(Dk))$ represents the disk key encrypted by using a bunch of master keys generated by encryption using the shared encryption key Bk. $E_{Bk}(E_{Dk}(ADi))$ represents audio data encrypted using the disk key generated by encryption using the shared encryption key Bk.

$E_{Dk}(Dk)$ generated by encrypting the disk key by itself and $\{E_{Mki}(Dk)\}$ generated by encrypting the disk key using the bunch of master keys are recorded in a key recording area (lead-in area) of the inner peripheral portion of the DVD 1. WM(ADi) obtained by embedding some of the master keys as an electronic watermark in the audio data sequence AD={AD1, AD2, . . . , ADi, . . . } and $E_{Dk}(ADi)$ generated by encryption using the disk key are recorded in a data recording area (data area) of the DVD 1.

Figure 2:
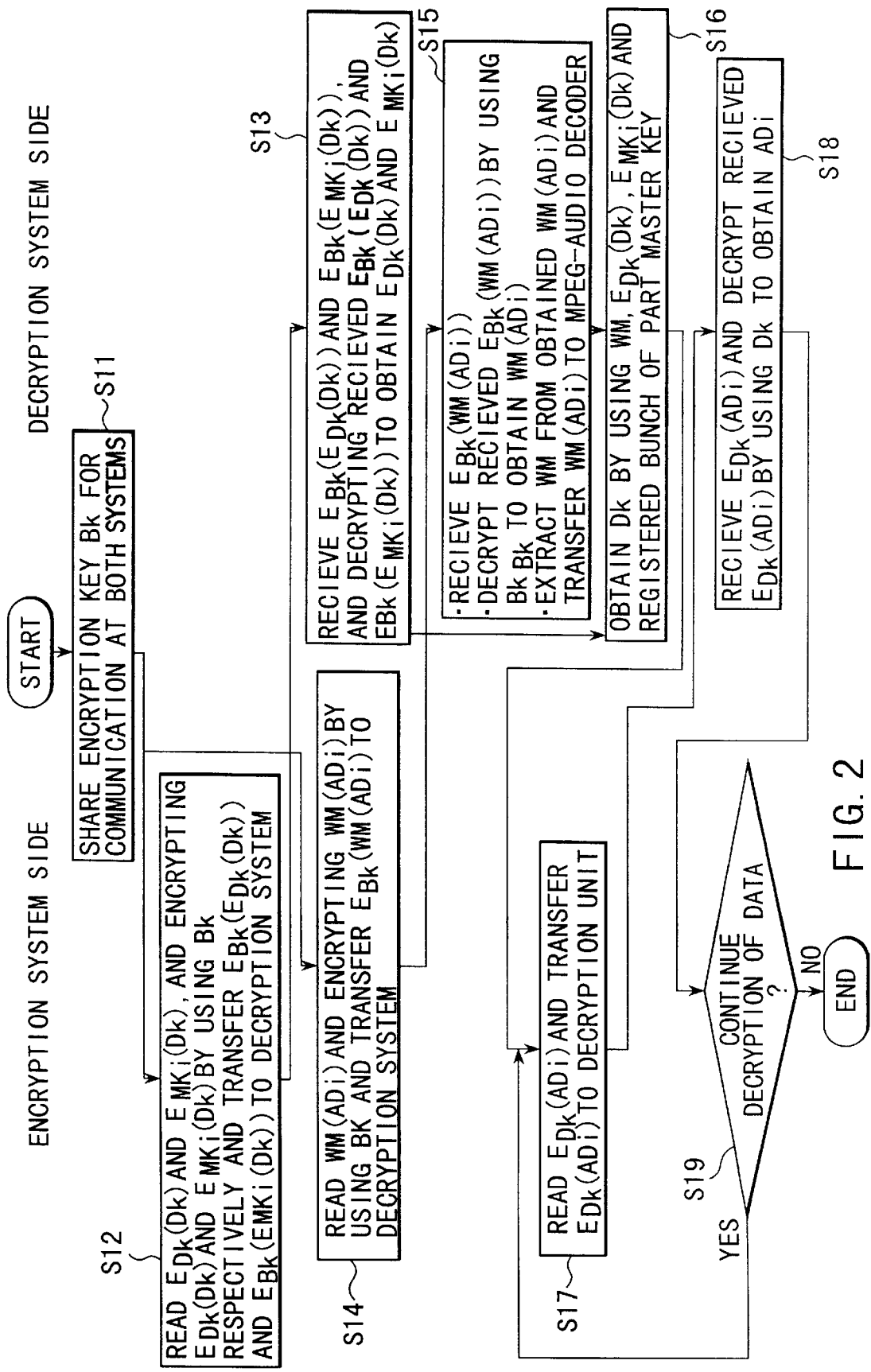
FIG. 2 is a flow chart showing the operation of the copy protection apparatus of the first embodiment.

The operation of this embodiment will be described with reference to a flow chart in FIG. 2.

In step S11, the encryption key Bk used in communication between the encryption and decryption systems A and C is shared using an existing encryption key sharing protocol 3.

In step S12, the disk key $E_{Dk}(Dk)$ encrypted using the disk key Dk itself and the disk key $\{E_{Mki}(Dk)\}$ encrypted using the bunch of master keys, which are recorded on the DVD 1 by a DVD drive unit (not shown) are read. The encryption unit 4 encrypts the read keys using the shared encryption key Bk to obtain $E_{Bk}(E_{Dk}(Dk))$ and $\{E_{Bk}(E_{Mki}(Dk))\}$. These codes are sent to the decryption system C via the CPU interface or bus B. Note that the data read from the DVD 1 are decoded and error-corrected by the demodulation/error correction unit 2 before the data are input to the encryption unit 4.

In step S13, the decryption unit 5 in the decryption system C decrypts, using the shared encryption key Bk, the keys $E_{Bk}(E_{Dk}(Dk))$ and $\{E_{Bk}(E_{Mki}(Dk))\}$ received through the CPU interface B to obtain $E_{Dk}(Dk)$ and $\{E_{Mki}(Dk)\}$.

In step S14, the encryption system A reads the audio data WM(ADi) in which information of some of the master keys Mki is embedded as an electronic watermark. The encryption unit 9 encrypts it using the shared encryption key Bk to obtain $E_{Bk}(WM(ADi))$. This data is sent to the decryption system C through the CPU interface B. Note that the data read from the DVD 1 are demodulated and error-corrected by the demodulation/error correction unit 7 before the data are input to the encryption unit 9.

In step S15, the decryption unit 10 in the decryption system C decrypts, using the shared encryption key Bk, the key $E_{Bk}(WM(ADi))$ received through the CPU interface B to extract WM(ADi). The electronic watermark extraction unit 11 extracts information WM as some of the master keys Mki embedded in the data ADi. WM(ADi) is sent to the MPEG-Decoder 14 through the control switch 13 upon extraction of the information WM.

In step S16, the master key decryption/determination unit 6 extracts the disk key Dk using the disk key $E_{Dk}(Dk)$ encrypted using the disk key Dk itself and the disk key $\{E_{Mki}(Dk)\}$ encrypted using the bunch of master keys, which are obtained in step S13, the information WM as some of the master keys obtained in step S15, and the bunch of part master keys registered in the decryption system in advance.

Figure 3:
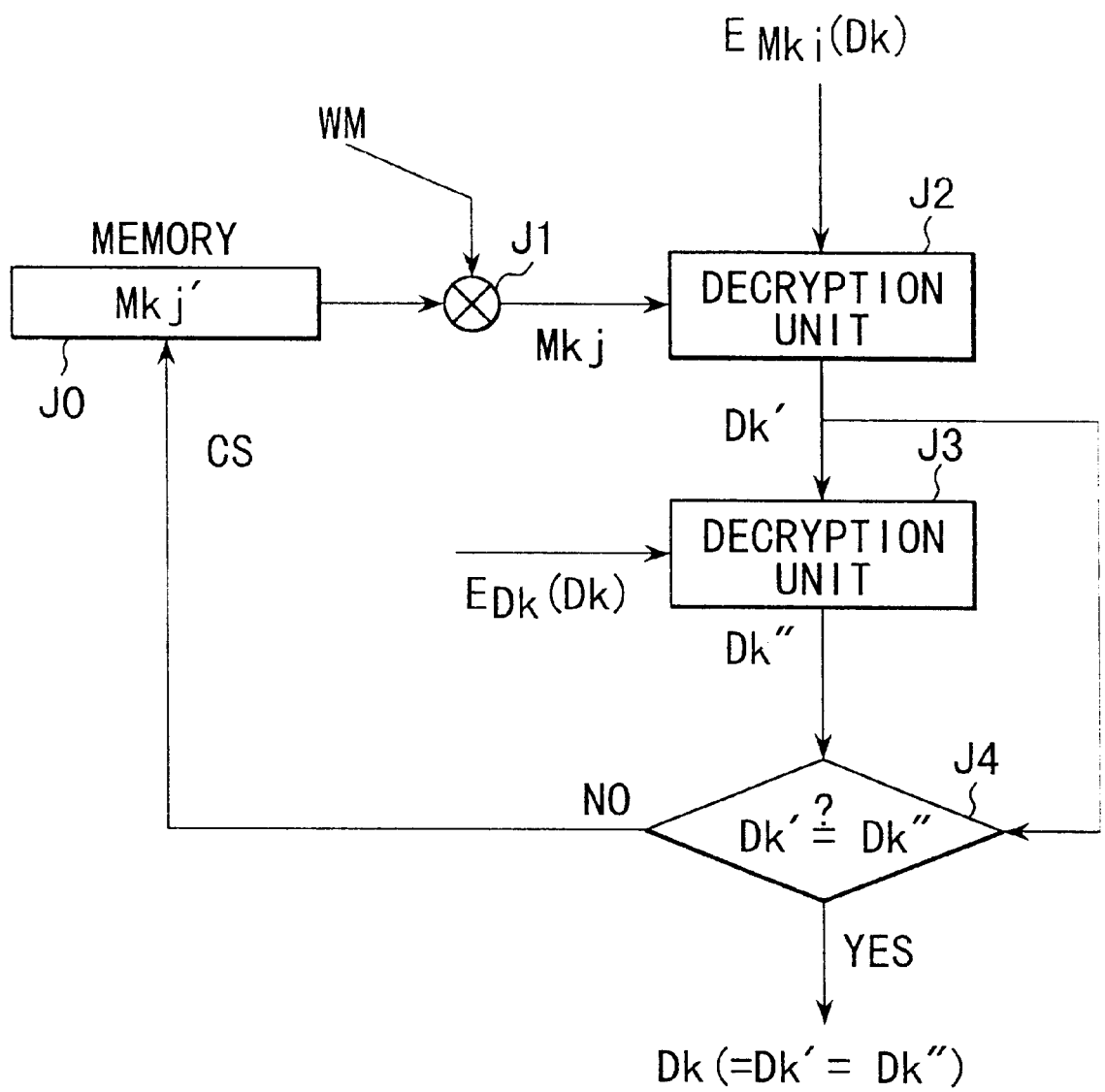
FIG. 3 is a flow chart showing the operation of a master key decryption/determination unit in the copy protection apparatus of the first embodiment.

The operation of the master key decryption/determination unit 6 will be described below with reference to FIG. 3.

The part master key Mkj' is extracted from a memory (J0) in which a given bunch of part master keys {Mkj'} in the decryption system C is stored. The master key decryption/determination unit 6 performs computation (J1) for generating a predetermined master key using the information WM as some of the master keys, thereby obtaining a master key candidate Mkj.

A decryption unit J2 decrypts, using the master key candidate Mkj, the disk key $E_{Mki}(Dk)$ encrypted using the bunch of master keys {Mki} to obtain a disk key candidate Dk'. A decryption unit J3 decrypts, using the disk key candidate Dk', the key $E_{Dk}(Dk)$ obtained by encrypting the disk key using itself to obtain a disk key candidate Dk".

A comparator J4 compares the disk key candidate Dk" with the disk key candidate Dk'. If they coincide with each other, the disk key candidate Dk' is output from the master key decryption/determination unit 6 as the correct disk key Dk; otherwise, the above operation is repeated until a correct disk key Dk is obtained.

In step S17, the audio data $E_{Dk}(ADi)$ encrypted by the disk key Dk and recorded on the DVD 1 by a DVD drive unit (not shown) is read and sent to the decryption system C via the CPU interface B. The data read from the DVD 1 are demodulated and error-corrected by the demodulation/error correction unit 7 before the data are sent to the CPU interface B.

In step S18, the decryption unit 12 in the decryption system C decodes, using the disk key Dk, $E_{Dk}(ADi)$ received via CPU interface B to obtain compressed audio data ADi as a plaintext.

It is determined in step S19 whether the decryption process continues. If YES in step S19, the operations in steps S17 and S18 are repeated.

When the resultant audio data ADi is compressed by the data compression standard called, e.g., MPEG-Audio, it is decoded (expanded) by the MPEG-Decoder 14. The decoded data is converted into an analog signal by the D/A converter 15. The analog signal is sent to an audio amplification/output unit such as a loudspeaker amplifier (not shown) and reproduced.

The execution order of steps S12 and S14 is reversible.

The audio data in which the information of some of the master keys is embedded as the electronic watermark information has a length enough to embed the key information of some of the master keys. If the audio data does not have a sufficient length, the electronic watermark information is embedded in a plurality of audio data.

The audio data ADi need not be transferred from the decryption unit 12 to the MPEG-Decoder 14 one by one, but may be transferred in units of a predetermined number of audio data.

According to the copy protection apparatus of this embodiment, electronic watermark information must be used to decrypt a disk key, and unauthorized business operations of selling copied media can be prevented, thereby preventing copyright infringement.

According to the copy protection apparatus of this embodiment, encryption and decryption units can be designed independently of the core of the reproduction portion of the digital recording/reproduction equipment, such as the DVD 1, as can be apparent from FIG. 1. Even if a cryptographic algorithm and electronic watermark are broken, only the decryption system C (or both the encryption and decryption systems A and C) is replaced with another one.

According to the copy protection apparatus of the present invention, even if data flowing on the CPU bus B is stored, it cannot be reproduced or used since the data flowing on the CPU bus is encrypted and in which water mark information is embedded.

Master key information registered on the decryption system C side does not serve as perfect key information. Every time the DVD 1 is played back, key information contained in the contents must be used to obtain perfect key information. Even if master key information registered in the decryption system is perfectly revealed and misuse is tried using the revealed master key information, the DVD 1 cannot be normally played back.

Finally, a method of recording audio data and key information on the DVD 1 according to this embodiment will be described with reference to FIG. 4.

In the system of this embodiment, when input audio data is analog data (A-Audio), an A/D converter 21 converts it into digital data (D-Audio). Copy control information (CCI) data and the like are embedded in the converted digital data in an electronic watermark embedding unit 22, as needed. Note that the electronic watermark embedding unit 22 can be omitted depending on the system arrangement. An MPEG-Audio encoder 23 compresses the data.

The output audio data ADi from the MPEG-Audio encoder 23 is output to an electronic watermark embedding unit 25 by a switch 24 when the information WM as some of the master keys is to be embedded.

When the data is input, the electronic watermark embedding unit 25 embeds the information as some of the master keys as an electronic watermark in the audio data ADi and outputs data WM(ADi).

The electronic watermark embedding unit 25 receives the audio data ADi in which all pieces of information WM serving as some of the prepared master keys are embedded. The audio data WM(ADi) in which the information WM serving as some of the master keys are directly recorded on a DVD 27.

The audio data ADi in which the information WM serving as some of the master keys need not be embedded is output to an encryption unit 26 by a switch 24. The encryption unit 26 encrypts the disk key Dk using the input audio data ADi. The encrypted audio data Dk(ADi) is recorded on the DVD 27.

A key $\{E_{Mki}(Dk)\}$ obtained by encrypting the disk key Dk using the bunch of master keys used in encrypting the audio data ADi and a key Dk(Dk) encrypted by the disk key itself are also recorded on the DVD 27.

Figure 4:
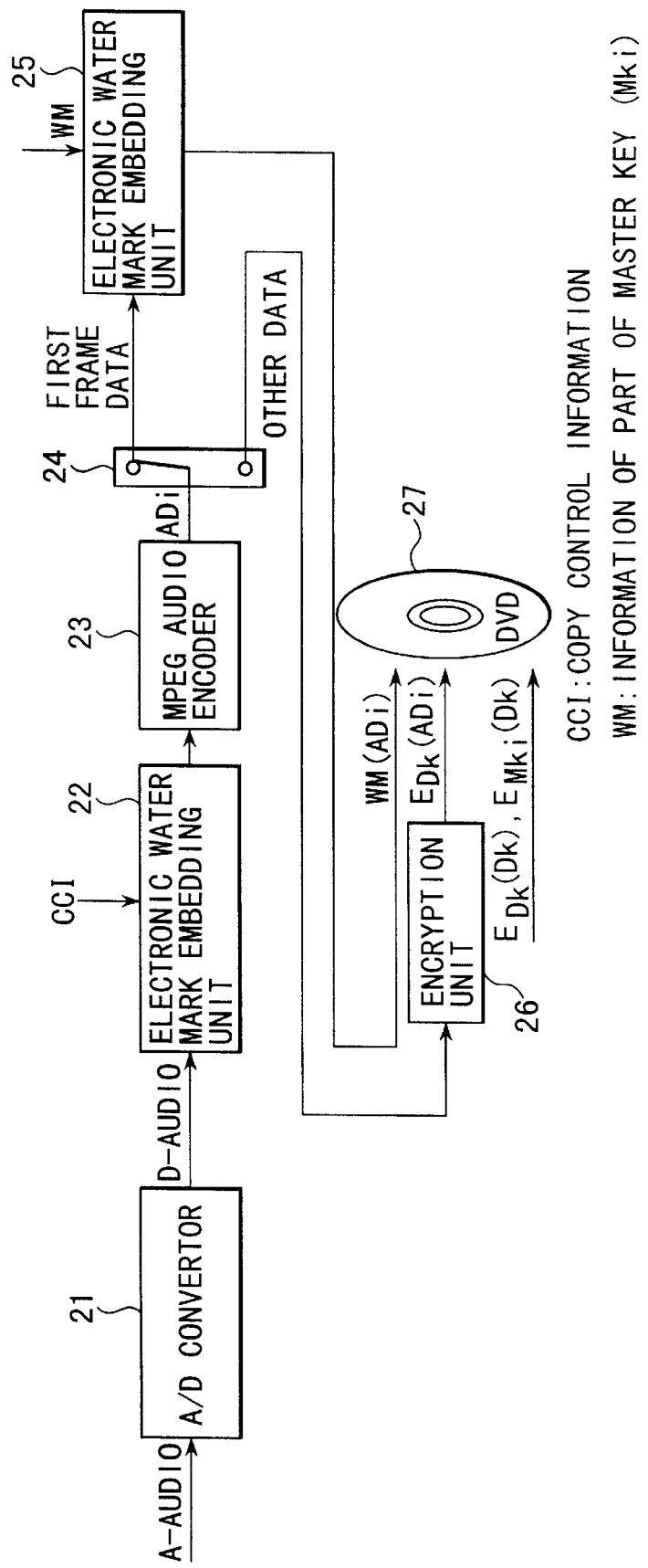
FIG. 4 is a block diagram showing a method of recording data on an information recording medium used in the copy protection apparatus of the first embodiment.

In FIG. 4, the information serving as some of the master keys is embedded as an electronic watermark in the audio data ADi compressed by the MPEG-Audio encoder 23. However, the electronic watermark embedding unit 25 may embed the electronic watermark in the digital audio data before compression. In this case, the electronic watermark embedding unit 25 can be omitted.

<Second Embodiment>

A copy protection apparatus according to the second embodiment of the present invention will be described below.

Figure 5:
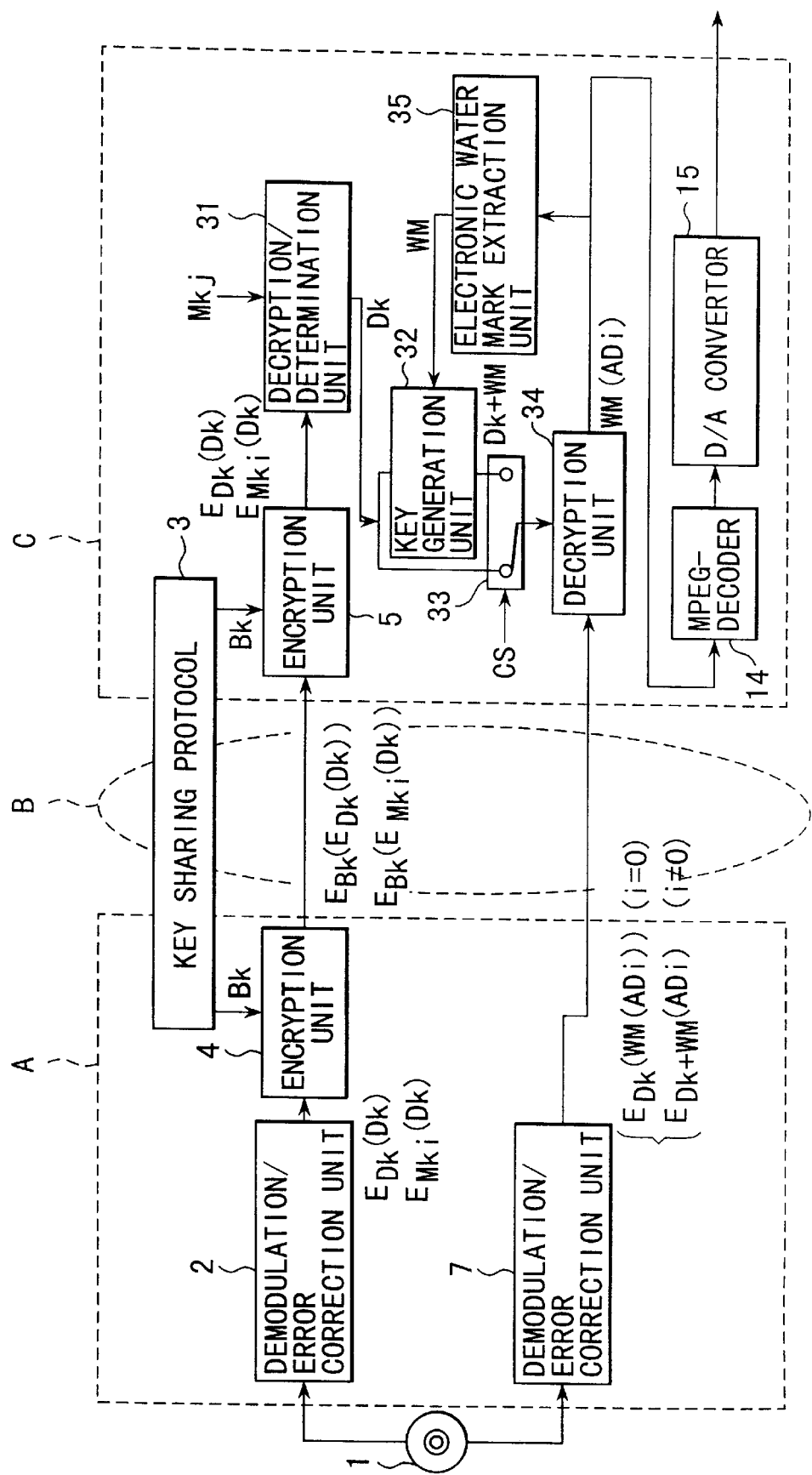
FIG. 5 is a block diagram showing a copy protection apparatus according to the second embodiment of the present invention.

FIG. 5 is a view showing the copy protection apparatus of the second embodiment of the present invention. The same reference numerals as in FIG. 1 denote the same parts in FIG. 5, and a detailed description thereof will be omitted.

The copy protection apparatus of this embodiment is connected to a so-called CPU bus of a playback CPU arranged in a computer such as a personal computer (to be referred to as a PC hereinafter), and encrypted data flows on the CPU bus. Note that only part associated with the playback CPU is illustrated in FIG. 5.

A encryption system A is connected to a decryption system C via a CPU bus B. Data from the decryption system C is output via, e.g., an I/O port except the CPU bus B. More specifically, in this embodiment, data is input/output without being through the CPU bus B, but data is transferred between the systems A and C using the CPU bus B.

The encryption system A comprises demodulation/error correction units 2 and 7, and an encryption unit 4. The encryption system A is formed as one independent IC chip.

The decryption system C comprises decryption units 5 and 34, a master key decryption/determination unit 31, an electronic watermark extraction unit 35, a control switch 33, and a key generation unit 32.

The control switch 33 receives a control signal (CS) for inputting a disk key Dk as an input signal when the first processing data sequence is input. Otherwise, the switch 33 receives a control signal (CS) for inputting a signal from the key generation unit 32 as an input signal.

In this embodiment, the decryption system C also includes an MPEG-Decoder 14 and a D/A converter 15 for converting the encoded digital audio data into analog audio data.

The two decryption units 5 and 34 are illustrated in the decryption system C in FIG. 5. However, one decryption unit can constitute these two decryption units in practice. The decryption system C is formed as one independent IC chip.

Some of master keys to be described later are registered (stored) in the decryption system. The master keys are recorded in a secret area in the chip so as not to allow a user to externally obtain them or intentionally read out them from the chip of the decryption system C.

The number of types of keys $E_{Mki}(Dk)$ obtained by encrypting the disk key using master keys Mki recorded on a DVD 1 and the number of types of part master keys Mki in the decryption system C can be set in the same manner as in the first embodiment.

The encryption and decryption keys (both are Bk because the shared encryption key is used) used in cryptographic communication via the CPU bus B are shared by the encryption and decryption systems A and C.

A controller (not shown) controls the overall operation. For example, the controller can be realized by causing the CPU of the computer to execute a program. Examples of control of this controller are designation associated with a data read from the DVD 1, designation of data transfer destination, designation associated with data output from the decryption system, and the like.

The controller is triggered by a user through a user interface or by a process in a given application program.

In this embodiment, a digital source audio data sequence, an audio data sequence (compressed data sequence), and audio data in which data of some of the master keys is embedded as an electronic watermark are represented by D-Audio, AD={AD1, AD2, ..., ADi, ...}, and WM(ADi), respectively.

Depending on audio data sequences AD, copy control electronic watermark information may be embedded in addition to the embedded electronic watermark information. Let Bk, Dk, {Mk1, Mk2, ..., Mki, ..., Mkn}, and {Mk1', Mk2', ..., Mkj', ..., Mkm'} be the encryption key (to be referred to as a shared encryption key) shared between the encryption and decryption systems, the encryption key (disk key) for encrypting the audio data sequence, the bunch of n encryption keys (master keys) for encrypting the disk key, and the bunch of part master keys registered in the decryption system, respectively.

In FIG. 5, $E_{Dk}(Dk)$ represents a disk key generated by encryption using the disk key itself. $\{E_{Mki}(Dk) \, (i=0, 1, \ldots, n-1)\}$ represents disk keys generated by encryption using the n master keys. WM(ADi) represents audio data ADi generated by embedding information necessary for generating encryption keys for subsequent audio data using an electronic watermark technique. $E_{Dk+WM}(ADi)$ represents audio data generated by encryption using the disk key Dk and the information WM sent to the decryption system by the electronic watermark in advance. $E_{Bk}(E_{Dk}(Dk))$ represents the disk key itself encrypted using the disk key generated by encryption using the shared encryption key Bk. $E_{Bk}(E_{Dk}(ADi))$ represents disk keys encrypted using the bunch of master keys encrypted using the shared encryption key Bk.

$E_{Dk}(Dk)$ generated by encrypting the disk key by itself and $\{E_{Mki}(Dk)\}$ generated by encrypting the disk key using the bunch of master keys are recorded in a key recording area (lead-in area) of the inner peripheral portion of the DVD 1. $E_{Dk}(WM(ADi))$ in which part of the information for generating the decryption key of the subsequent audio data in the audio data sequence AD={AD1, AD2, ..., ADi, ...} is embedded as an electronic watermark and $E_{Dk+WM}(ADi)$ generated by encryption using a data key (i.e., a key generated by the disk key and the information WM sent to the decryption system as the electronic watermark) are recorded in a data recording area (data area) of the DVD 1.

The operation of this embodiment will be described with reference to a flow chart in FIG. 6.

In step S21, the encryption key Bk used in communication between the encryption and decryption systems A and C is shared using an existing key sharing protocol.

In step S22, the disk key $E_{Dk}(Dk)$ encrypted using the disk key Dk itself and the disk key $\{E_{Mki}(Dk)\}$ encrypted using the bunch of master keys, which are recorded on the DVD 1 by a DVD drive unit (not shown) are read. The encryption unit 4 encrypts the read keys using the shared encryption key Bk to obtain $E_{Bk}(E_{Dk}(Dk))$ and $\{E_{Bk}(E_{Mki}(Dk))\}$. These codes are sent to the decryption system C via the CPU interface B.

Note that the data read from the DVD 1 are demodulated and error-corrected by the demodulation/error correction unit 2 before the data are input to the encryption unit 4.

In step S23, the decryption unit 5 in the decryption system C decodes, using the shared encryption key Bk, the keys $E_{Bk}(E_{Dk}(Dk))$ and $E_{Bk}(E_{Mki}(Dk))$ received through the CPU interface B to obtain $E_{Dk}(Dk)$ and $E_{Mki}(Dk)$.

In step S24, the master key decryption/determination unit 31 extracts the disk key Dk using the disk key $E_{Dk}(Dk)$ encrypted using the disk key Dk itself, the disk key $\{E_{Mki}(Dk)\}$ encrypted using the bunch of master keys Mki, and the bunch of master keys Mkj registered in the decryption system in advance.

The operation of the master key decryption/determination unit 31 will be described below.

The master key Mkj is extracted from a memory which has registered the bunch of master keys {Mkj} in the decryption system. The disk key $E_{Mki}(Dk)$ encrypted using the bunch of master keys {Mki} is decrypted using a master key candidate Mkj to obtain a disk key candidate Dk'.

$E_{Dk}(Dk)$ obtained by encrypting the disk key by itself is decrypted using the disk key candidate Dk' to obtain a disk key candidate Dk".

The disk key candidate Dk" is compared with the disk key candidate Dk'. If they coincide with each other, the disk key candidate Dk' is determined as a correct disk key and output from the master key decryption/determination unit 31. If they do not coincide with each other, the above operation is repeated until a correct disk key is obtained.

In step S25, the encryption system A reads the audio data $E_{Dk}(WM(ADi))$ which is recorded on the DVD 1 by a DVD drive unit (not shown) and encrypted by the disk key Dk and in which information necessary for generating the decryption key of the subsequent audio is embedded. The read audio data is sent to the decryption system C via the CPU interface B. Note that the data read from the DVD 1 are demodulated and error-corrected by the demodulation/error correction unit 7 before the data are input to the encryption system A.

In step S26, using the disk key Dk, the decryption unit 34 in the decryption system C decrypts the data $E_{Dk}(WM(ADi))$ received via the CPU interface B to extract the key WM(ADi). The electronic watermark extraction unit 35 then extracts the information WM necessary for generating the decryption key of the subsequent audio data, which is embedded in the data ADi. After the information WM is extracted, WM(ADi) is directly supplied to the MPEG-Decoder. The key generation unit 32 generates audio data decryption key Dk+WM using the disk key Dk and the key generation information WM.

In this case, the decryption key (this key is the same as the encryption key in use of the common key encryption) corresponding to the encryption key used to record audio data on the DVD 1. The following various relationships can be set between the disk key used in encryption/decryption the first audio data, the key generation information WM, and the key used in encryption/decryption the subsequent audio data. The subsequent audio data (encryption/decryption) key is expressed as Dk+WM in the following description.
(Relationship 1)

Exclusive OR data adjusted to have the same data length as that of the disk key by the disk key Dk and the key generation information WM is defined as the encryption key of the subsequent audio data.
(Relationship 2)

The disk key Dk encrypted using the key generation information WM as the encryption key is defined as the encryption key of the subsequent audio data.

In step S27, the DVD drive unit (not shown) reads audio data $E_{Dk+WM}(ADi)$ recorded on the DVD 1 and encrypted using the audio data key Dk+WM and sends it to the decryption system C via the CPU interface B. The data read from the DVD 1 are demodulated and error-corrected by the demodulation/error correction unit 7 before they are sent via the CPU interface B.

In step S28, using the audio data key Dk+WM, the decryption unit 34 in the decryption system C decrypts the data $E_{Dk+WM}(ADi)$ received through the CPU interface B, thereby obtaining the compressed audio data ADi serving as a plaintext.

In step S29, it is determined whether decryption continues. If YES in step S29, the operations in steps S27 and S28 are repeated.

As described above, when the resultant data ADi is compressed complying with the data compression standard called, e.g., MPEG-Audio, the data is decoded (expanded) by the MPEG-Decoder 14 and converted into an analog signal by the D/A converter 15. The analog signal is sent to an audio amplification/output unit such as a speaker amplifier (not shown) and then reproduced.

The data in which the key generation information of the audio data key is embedded as the electronic watermark information has a length enough to embed the key generation information of the audio data key. If the audio data does not have a sufficient length, the electronic watermark information is embedded in a plurality of audio data.

The audio data ADi need not be transferred from the decryption unit 34 to the MPEG-Decoder 14 one by one, but may be transferred in units of a predetermined number of audio data.

According to the copy protection apparatus of this embodiment, electronic watermark information is embedded in the multimedia data and used to decrypt the multimedia data, and unauthorized business operation of selling copied media can be prevented, thereby preventing infringement of copyrights.

According to the copy protection apparatus of this embodiment, as in the first embodiment, encryption and decryption units can be designed independently of the core of the reproduction portion of the digital recording/reproduction equipment, such as the DVD, as can be apparent from FIG. 5. Even if a cryptographic algorithm and electronic watermark are broken, only the decryption system C (or both the encryption and decryption systems A and C) is replaced with another one.

Figure 7:
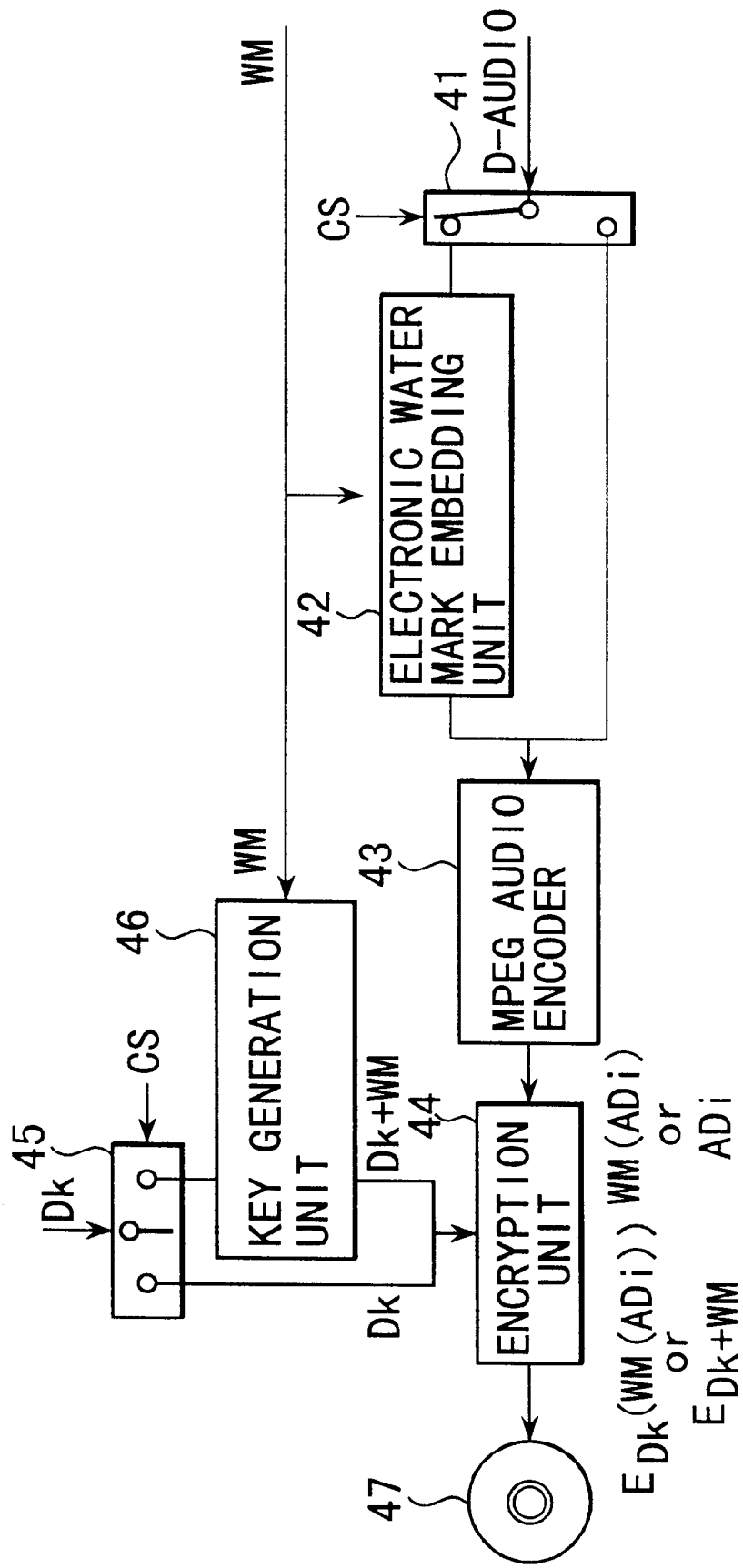
FIG. 7 is a block diagram showing a method of recording data on an information recording medium used in the copy protection apparatus of the second embodiment.

Finally, a method of recording the audio data and key information on a DVD 1 according to this embodiment will be described with reference to FIG. 7.

In this system, when input audio data is analog data A-Audio, it is converted into digital audio data D-Audio by an analog-to-digital converter, and the digital audio data is input.

An electronic watermark embedding unit 42 generates data obtained by embedding the information WM in the first input digital data D-Audio. This information WM is necessary for generating the encryption key used in recording the audio data on the a DVD 47 upon encrypting it. An MPEG-Audio encoder 43 compresses the data output from the unit 42 and outputs the audio data WM(ADi).

In this case, a key generation unit 46 generates the encryption key Dk+WM using the disk key Dk and the information WM necessary for generating the encryption key for recording data on the DVD 47.

The key generation unit 46 has any arrangement in which the encryption key Dk+WM cannot be generated by any one of the disk key Dk and the key information WM.

The output audio data ADi output from the MPEG-Audio encoder 43 is encrypted using the disk key Dk by an encryption unit 44. The encrypted audio data $E_{Dk}$(WM(ADi)) is recorded on the DVD 47.

When all the information WM necessary for generating the encryption key Dk+WM for recording data on the DVD 47 is embedded in the electronic watermark embedding unit 42, a switch 41 is switched by a control signal CS. The subsequent digital data D-Audio are directly input to the MPEG-Audio encoder 43, and the corresponding compressed audio data ADi are output.

The encryption unit 44 encrypts the input audio data ADi using the encryption key Dk+WM and outputs $E_{Dk+WM}$(ADi). The encrypted output data $E_{Dk+WM}$(ADi) is recorded on the DVD 47.

The DVD 47 also records $\{E_{Mki}(Dk)\}$ obtained by encrypting the disk key Dk (used in encrypting the audio data ADi) using the bunch of master keys, and Dk(Dk) encrypting using the disk key itself.

For the sake of descriptive simplicity, the audio data ADi compressed by the MPEG-Audio encoder is directly encrypted using the encryption key Dk+WM. The following improvement further protects the data.

(Improvement)

The key generation information WM is defined as information WMi changing as a function of the time series, and all audio data are embedded as electronic watermark information. The encryption key for recording data on the DVD 47 is changed as $Dk+WM_{i-1}$ each time on the basis of the embedded information $WM_i$. Encrypted audio data $E_{Dk+WMi-1}$(WM(ADi)) is recorded on the DVD 47.

<Third Embodiment>

Figure 8:
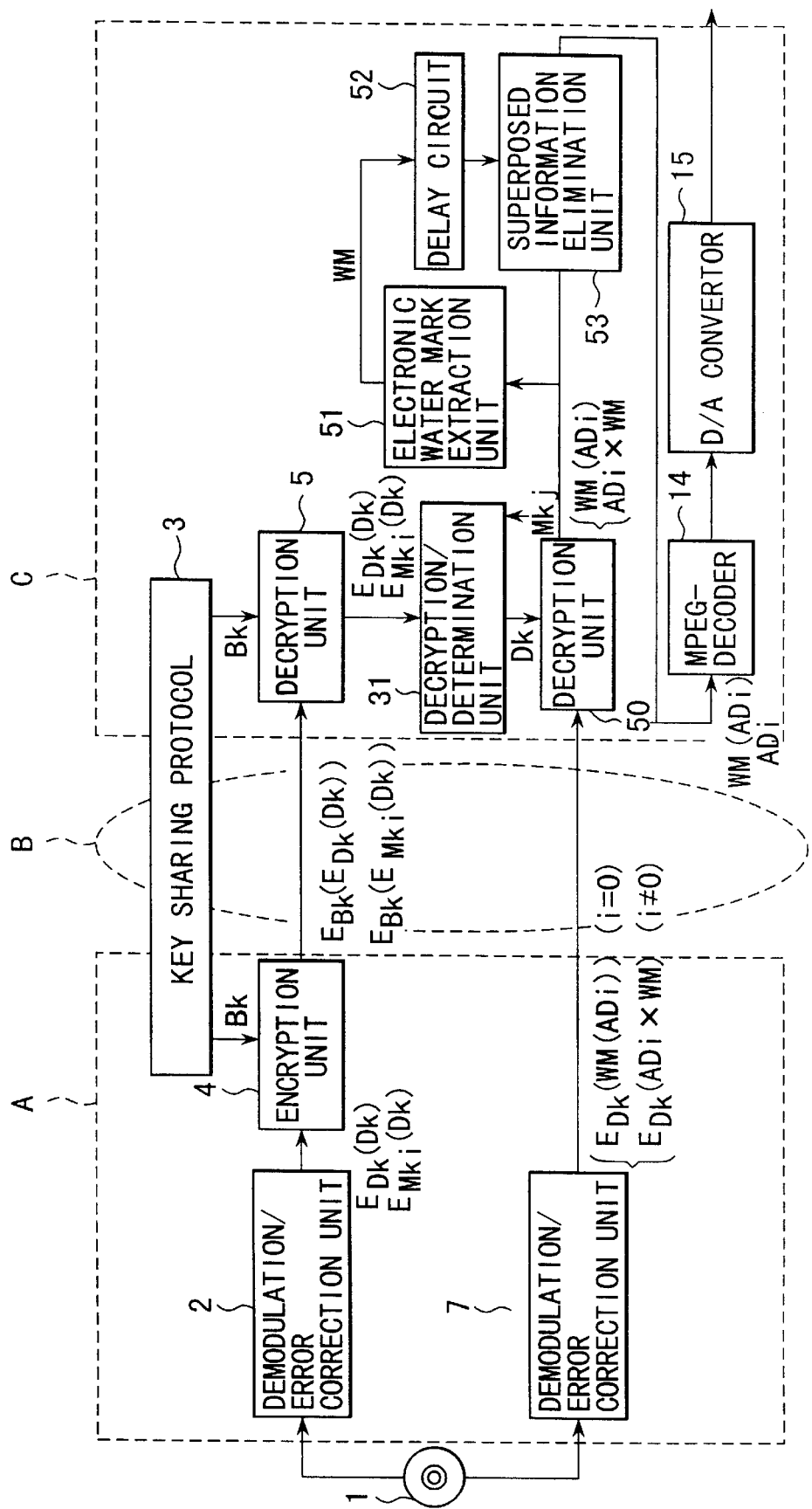
FIG. 8 is a block diagram showing a copy protection apparatus according to the third embodiment of the present invention.

FIG. 8 is a block diagram showing a copy protection apparatus according to the third embodiment of the present invention. The same reference numerals as in FIG. 1 denote the same parts in FIG. 8, and a detailed description thereof will be omitted. Only a portion associated with playback CPU is illustrated in FIG. 8.

The copy protection apparatus of this embodiment comprises a DVD drive unit (not shown) for reading data from a DVD 1, and encryption and decryption systems A and C connected to the DVD drive unit without being through a CPU bus or incorporated in the DVD drive unit.

The encryption system A is connected to the decryption system C via a CPU bus B. Data from the decryption system C is output via, e.g., an I/O port except the CPU bus B. More specifically, in this embodiment, data is input/output without being through the CPU bus B, but data is transferred between the systems A and C using the CPU bus B.

The encryption system A comprises demodulation/error correction units 2 and 7, and an encryption unit 4. The encryption system A is formed as one independent IC chip.

The decryption system C comprises decryption units 5 and 50, a master key decryption/determination unit 31, an electronic watermark extraction unit 51, a superposed information elimination unit 53, and a delay unit 52. The decryption system C of this embodiment includes an MPEG-Decoder 14 and an D/A converter 15 for converting the decoded digital audio data into analog audio data.

The two decryption units 5 and 50 are illustrated in the decryption system C, but only one unit can constitute these two units. The decryption system is formed as one independent IC chip.

Some of master keys are registered (stored) in the decryption system as in the second embodiment. The master keys are recorded in a secret area in the chip so as not to allow a user to externally obtain them or intentionally read out them from the chip of the decryption system.

The number of types of keys $E_{Mki}$(Dk) recorded on a DVD 1 and generated by encrypting the disk key using master keys Mki and the number of types of master keys Mki in the decryption system C can be set as in the first embodiment.

The encryption and decryption keys (both are Bk because the common key encryption is used) used in cryptographic communication via the CPU bus B are shared by the encryption and decryption systems A and C.

A controller (not shown) controls the overall operation. For example, the controller can be realized by causing the CPU of the computer to execute a program. Examples of control of this controller are designation associated with a data read from the DVD, designation of data transfer destination, designation associated with data output from the decryption system, and the like.

The controller is triggered by a user through a user interface or by a process in a given application program.

In this embodiment, a digital source audio data sequence, an audio data sequence (compressed data sequence), and an audio data in which any information is embedded as an electronic watermark are represented by D-Audio, AD={AD1, AD2, . . . , ADi, . . . }, and WM(ADi), respectively.

Depending on audio data sequences AD, copy control electronic watermark information may be embedded in addition to the embedded electronic watermark information. Let Bk, Dk, {Mk1, Mk2, . . . , Mki, . . . , Mkn}, and {Mk1', Mk2', . . . , Mkj', . . . , Mkm'} be the encryption key (to be referred to as a shared encryption key) shared between the encryption and decryption systems A and C, the encryption key (disk key) for encrypting the audio data sequence, the bunch of n encryption keys (master keys) for encrypting the disk key, and the bunch of part master keys registered in the decryption system C, respectively.

In FIG. 8, $E_{Dk}(Dk)$ represents a disk key generated by encryption using the disk key itself. $\{E_{Mki}(Dk)\}$ (i=0, 1, . . . , n−1)} represents disk keys generated by encryption using the n master keys. WM(ADi) represents audio data ADi generated by embedding information necessary for generating encrypted keys for subsequent audio data using an electronic watermark technique.

$E_{Dk}(WM(ADi))$ represents WM(ADi) encrypted and generated using the disk key Dk. ADiXWM represents the audio data ADi on which the information WM sent to the decryption system by the electronic watermark in advance is superposed. $E_{Dk}(ADiXWM)$ represents (ADiXWM) encrypted and generated using the disk key Dk. $E_{Bk}(E_{Dk}(Dk))$ represents $E_{Dk}(Dk)$ encrypted and generated using the shared encryption key Bk. $E_{Bk}(E_{Mki}(Dk))$ represents $E_{Mki}(Dk)$ encrypted and generated using the shared encryption key Bk. Note that 'X' indicates a superposition operation for disturbing data. For example, it indicates an operation in which data are subjected to an appropriate scramble, and 'ADiXWM' indicates that ADi is scrambled by using an appropriate WM.

$E_{Dk}(Dk)$ generated by encrypting the disk key by itself and $\{E_{Mki}(Dk)\}$ generated by encrypting the disk key using the bunch of master keys are recorded in a key recording area (lead-in area) of the inner peripheral portion of the DVD 1. $E_{Dk}(WM(ADi))$ generated by encrypting, using the disk key, the audio data in which information superposed oh the subsequent audio data in the audio data sequence AD={AD1, AD2, . . . , ADi, . . . } is embedded as the electronic watermark information WM, and $E_{Dk}(ADiXWM)$ obtained by encrypting, using the disk key, the audio data superposed with the electronic watermark information WM, are recorded in a data recording area (data area).

Figure 9:
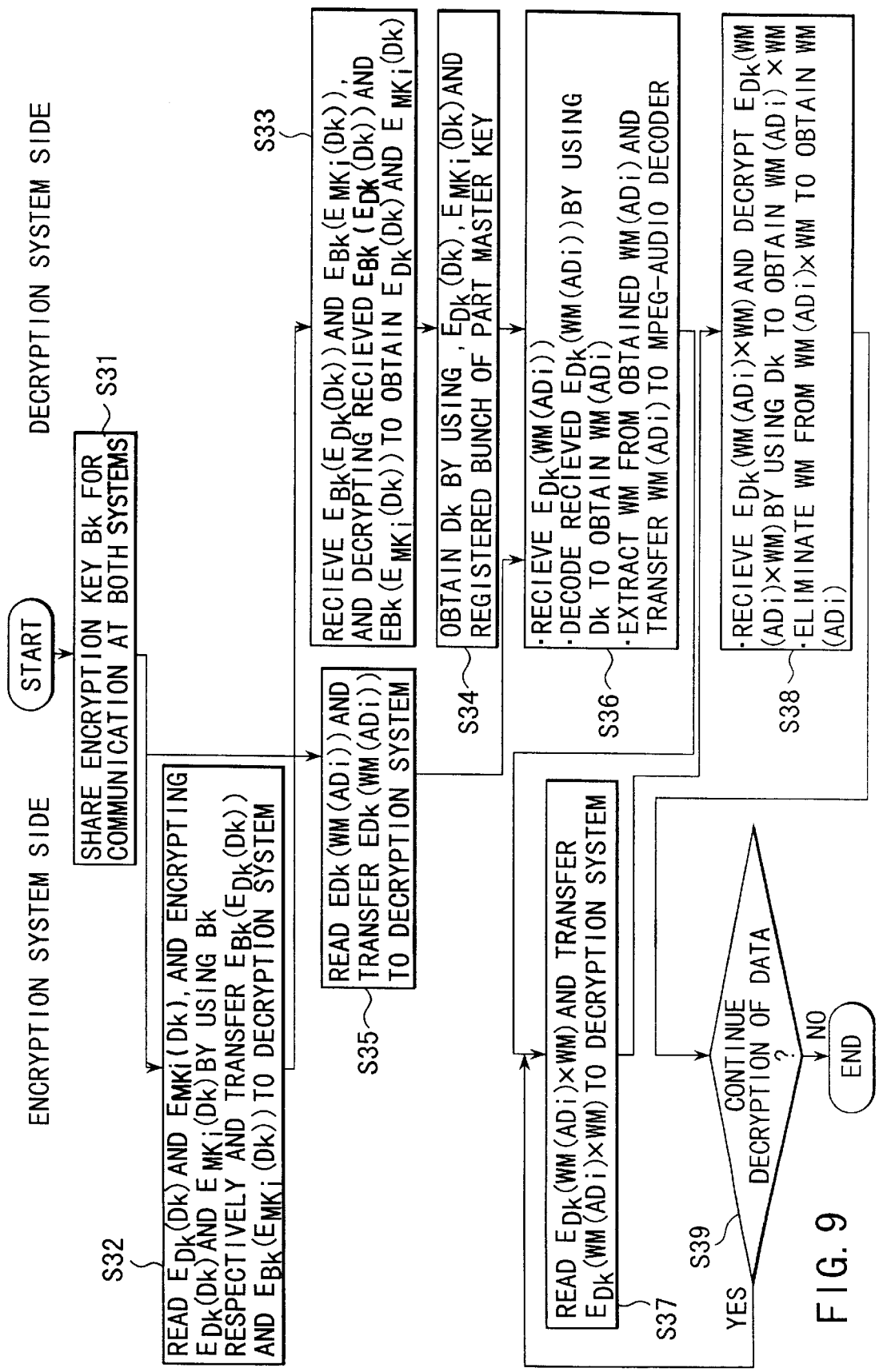
FIG. 9 is a flow chart showing the operation of the copy protection apparatus of the third embodiment.

The operation of this embodiment will be described with reference to the flow chart in FIG. 9.

Figure 6:
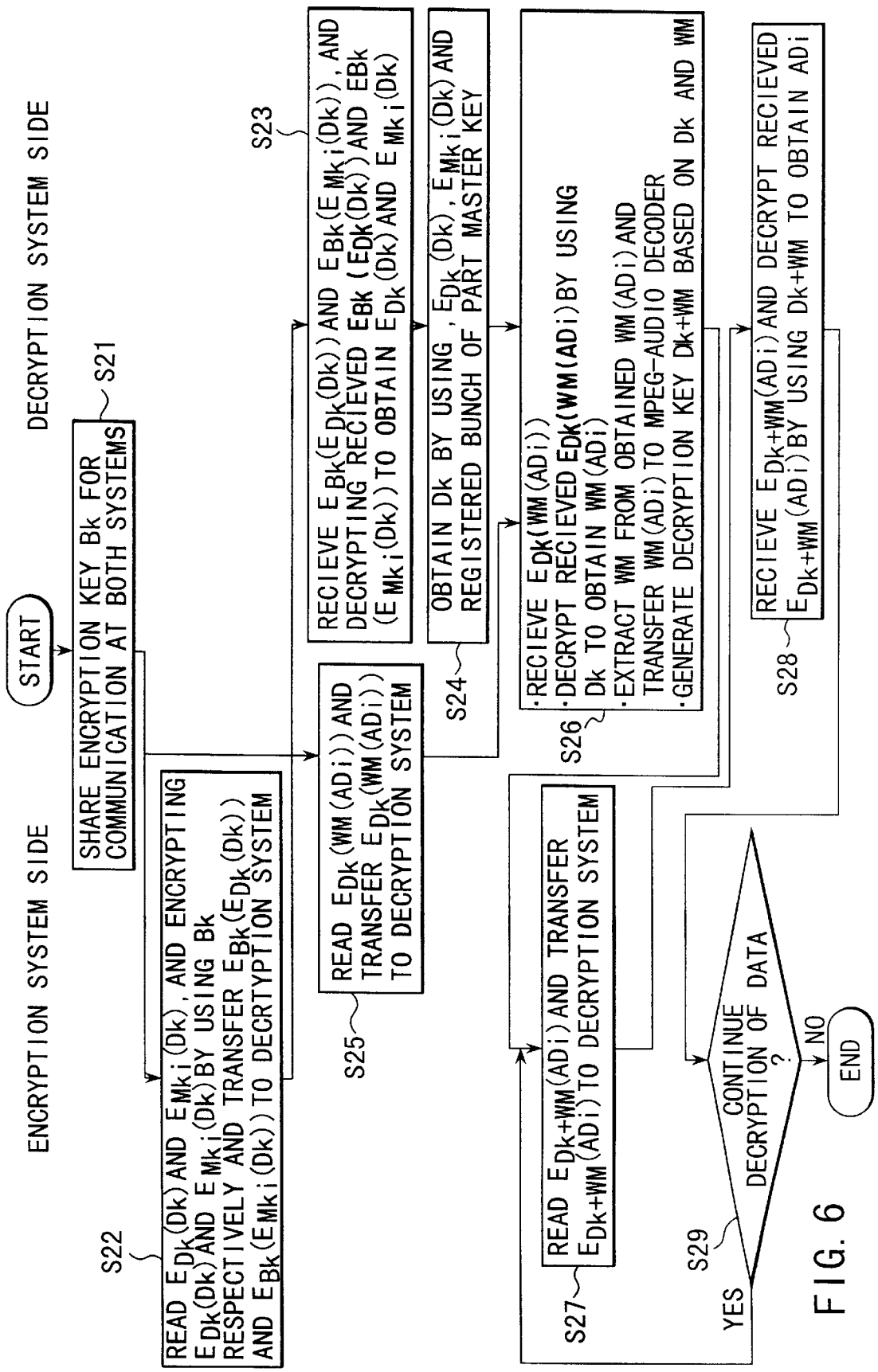
FIG. 6 is a flow chart showing the operation of the copy protection apparatus of the second embodiment.

Steps S31 to S35 are identical to steps S21 to S25 of the flow chart shown in FIG. 6 and described in the second embodiment.

In step S36, the decryption unit 50 in the decryption system C decrypts, using the disk key Dk, the data $E_{Dk}(WM(ADi))$ received via the CPU interface B to extract WM(ADi). The electronic watermark extraction unit 51 extracts the information WM embedded in the data ADi and superposed on the subsequent audio data.

Upon extracting the information WM, WM(ADi) is directly supplied to the MPEG-Decoder 14. In this case, various relationships can be set for a method of superposing the information WM on the audio data and the information WM superposed in recording the audio data on the DVD 1 as follows. Computation used in this superposition is represented by 'X' in the following description.

(Relationship 1)

The superposed information WM is adjusted to have the same data length as that of the audio data ADi by some means, and the superposed information WM and the audio data ADi are logically ORed.

(Relationship 2)

The audio data ADi is encrypted using the superposed information WM as an encryption key.

In step S37, $E_{Dk}(ADiXWM)$ which is generated by encrypting the audio data, superposed with the watermark information WM, using the disk key Dk and which is recorded on the DVD 1 is read by a DVD drive unit (not shown). The read data $E_{Dk}(ADiXWM)$ is sent to the decryption system C via the CPU interface B.

The data read from the DVD 1 are demodulated and error-corrected by the demodulation/error correction unit 7 before they are sent to the CPU interface B.

In step S38, the decryption unit 50 in the decryption system C decrypts, using the audio data key Dk, $E_{Dk}(ADiXWM)$ received via the CPU bus B. The superposed information elimination unit 53 extracts the superposed information WM to obtain the compressed audio data ADi serving as the plaintext.

In step S39, it is determined whether decryption continues. If YES in step S39, operations in steps S37 and S38 are repeated.

When the resultant audio data ADi is compressed by the data compression standard called, e.g., MPEG-Audio, it is decoded (expanded) by the MPEG-Decoder 14. The decoded data is converted into an analog signal by the D/A converter 15. The analog signal is sent to an audio amplification/output unit such as a loudspeaker amplifier (not shown) and reproduced.

The superposed information to be embedded in the audio data may be embedded in a plurality of audio data, as needed.

The audio data ADi need not be transferred from the decryption system C to the MPEG-Decoder 14 one by one, but may be transferred in units of a predetermined number of audio data.

According to the copy protection apparatus of this embodiment, electronic watermark information is embedded in the multimedia data, and the multimedia data is decrypted using the embedded electronic watermark information, thereby preventing unauthorized copying.

According to the copy protection apparatus of this embodiment, encryption and decryption units can be designed independently of the core of the reproduction portion of the digital recording/reproduction equipment, such as the DVD 1, as can be apparent from FIG. 8. Even if a cryptographic algorithm and electronic watermark are broken, only the decryption system C (or both the encryption and decryption systems A and C) is replaced with another one.

In any of the above embodiments, the CPU bus communication unit using the shared encryption key can be omitted to obtain an embodiment suitable for a stand-alone DVD player.

Figure 10:
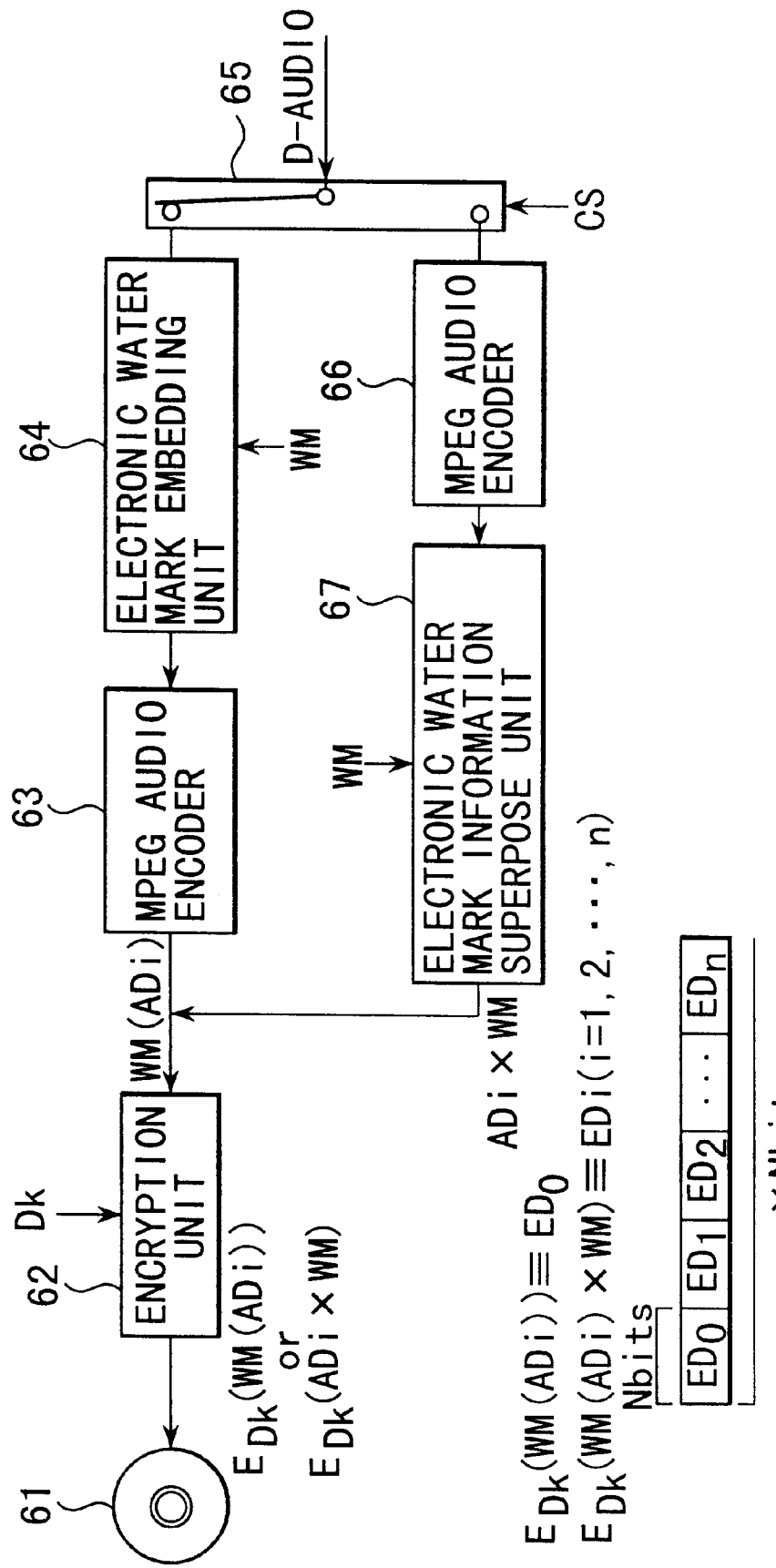
FIG. 10 is a block diagram showing a method of recording data on an information recording medium used in the copy protection apparatus of the third embodiment.

Finally, a method of recording the audio data and key information on a DVD 1 according to this embodiment will be described with reference to FIG. 10.

In this system, when input audio data is analog data A-Audio, it is converted into digital audio data D-Audio by an analog-to-digital converter, and the digital audio data is input.

An electronic watermark embedding unit 64 embeds the information WM, superposed on the subsequent audio data as the electronic watermark, in the first input digital data D-Audio. The resultant data is compressed by an MPEG-Audio encoder 63, thereby outputting audio information WD(ADi) in which the electronic watermark is embedded.

Using the disk key Dk, an encryption unit 62 generates audio data $E_{Dk}(WM(ADi))$ obtained by encrypting the audio information WM(ADi) in which the electronic watermark is embedded. The encrypted audio data WM(ADi) is recorded on a DVD 61.

When the electronic watermark embedding unit 64 embeds all the information WM superposed on the audio data, a switch 65 is switched by a control signal CS. The subsequent digital data D-Audio is compressed by an MPEG-Audio encoder 66, and an electronic watermark information superpose unit 67 superposes (expressed by a symbol 'X') the electronic watermark information WM on the compressed subsequent digital data D-Audio. Superposed audio data ADiXWM is output.

The superposed audio data ADiXWM is encrypted using the disk key Dk by the encryption unit 62 in the same manner as the audio information WM(ADi) in which the electronic watermark is embedded. The data ADiXWM is recorded on the DVD 61 as the encrypted audio data $E_{Dk}(ADiXWM)$.

The DVD 61 records $\{E_{Mk}(Dk)\}$ obtained by encrypting the disk key Dk using the bunch of master keys used in encrypting the audio data ADi and the superposed audio data ADiXWM, and Dk(Dk) obtained by encrypting the disk key by itself.

For the descriptive simplicity, the same information WM is superposed on all the audio data compressed by the MPEG-Audio encoder. However, the following improvement further protects the data.

(Improved Method 1)

The key generation information WM is defined as the information WMi changing as a function of the time series, information necessary for reproduction is embedded in all the audio data as the electronic watermark information, and the embedded information WMi serves as information for scrambling the next audio data. That is, the superposed audio data ADiXWM described above is recorded on the DVD 1 in the state of $E_{Dk}(WMi(ADi)XWMi-1)$.

(Improved Method 2)

The key generation information WM is defined as the information WMi changing as a function of the time series, information necessary for reproduction is embedded in all the audio data as the electronic watermark information, and the embedded information WMi serves as information for scrambling the audio data itself. Therefore, ADi is scrambled by WMi and then WMi is embedded in the scrambled ADiXWMi. That is, the superposed audio data ADiXWM described above is recorded on DVD 1 in the state of $E_{Dk}(WMi(ADi)XWMi)$.

(Improved Method 3)

The improved method 1 and 2 are generally described. Information necessary for reproduction is embedded in the audio data at a time as the electronic watermark information, and the embedded information WMi serves as information for scrambling data at an arbitrary time. Therefore, ADi is scrambled by WMj and then the WMj is embedded in the audio data ADj at arbitrary time as the electronic water mark information. That is, the superposed audio data ADiXWMj described above is recorded on the DVD 1 in the state of $E_{Dk}(WMi(ADi)XWMj)$.

The first, second, and third embodiments have been described independently of each other. However, various changes and modifications can be made. For example, the above three embodiments can be synthesized as one embodiment.

In each embodiment described above, an information recording medium is a DVD. However, the present invention is also applicable to other recording media such as CD-ROM.

Each embodiment described above has exemplified audio data as information to be decoded. However, the present invention is also applicable to reproducing apparatuses in other forms such as image data.

Each embodiment described above has exemplified a case in which information to be decoded is compressed complying with the standard called MPEG-Audio. The present invention is not limited to this. Information to be decoded may be compressed or encoded by another standard. In this case, a corresponding decoder is arranged in place of the MPEG-Audio decoder. Information to be decoded may be encoded or the like. In this case, the MPEG-Audio decoder is omitted.

A plurality of types of decoders may be arranged so as to output any one of data compressed by a variety of schemes. These decoders may be appropriately switched (or these may not be used). For example, an identifier representing a decoder to be used is read from a recording medium such as a DVD, and an appropriate decoder is selected in accordance with this identifier.

The arrangement of the decryption/determination unit shown in the first embodiment is a merely example, and any other arrangement may be used.

According to the present invention, part of information necessary for correctly decrypting or reproducing the recorded data is embedded in data recorded on the recording medium such as a DVD in accordance with the electronic watermark technique. Only authentic persons who can correctly decode (decrypt) the data sent by different means can perfectly decode (decrypt) the data.

As a result, unauthorized business operation of selling copied media can be prevented, thereby protecting copyright infringement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A copy protection apparatus comprising:
    an encryption system; and
    a decryption system connected to said encryption system via a CPU bus,
    wherein said encryption system comprises
        first encryption means for encrypting, using a shared encryption key shared by said encryption system and said decryption system, an encrypted disk key encrypted using a disk key itself,
        first transmission means for transmitting, via the CPU bus, the disk key encrypted by said first encryption means,
        second encryption means for encrypting, using the shared encryption key, the encrypted disk key encrypted using the master key, second transmission means for transmitting, via the CPU bus, the disk key encrypted by said second encryption means, third encryption means for encrypting, using the shared encryption key, multimedia data in which electronic watermark information serving as some of the master keys is embedded, third transmission means for transmitting, via the CPU bus, the multimedia data encrypted by said third encryption means, and fourth transmission means for transmitting the multimedia data encrypted using the disk key, and said decryption system comprises first decryption means for decrypting, using the shared encryption key, the disk key transmitted from said first transmission means, second decryption means for decrypting, using the shared encryption key, the disk key transmitted from said second transmission means, third decryption means for decrypting, using the shared encryption key, the multimedia data transmitted from said third transmission means, extraction means for extracting the watermark information from the multimedia data decrypted by said third decryption means, disk key acquisition means for acquiring the disk key on the basis of the disk key decrypted by said first decryption means, the disk key decrypted by said second decryption means, the watermark information extracted by said extraction means, and a part master key corresponding to some of the master keys, and fourth decryption means for decrypting, using the disk key acquired by said disk key acquisition means, the multimedia data transmitted from said fourth transmission means.

2. A copy protection apparatus according to claim 1, wherein said disk key acquisition means comprises:

first acquisition means for acquiring a master key candidate on the basis of the part master key and the watermark information;

second acquisition means for acquiring, using the master key candidate acquired by said first acquisition means, a first disk key candidate by decrypting the disk key decrypted by said second decryption means;

third acquisition means for acquiring, using the first disk key candidate acquired by said second acquisition means, a second disk key candidate by decrypting the disk key decrypted by said first decryption means;

determination means for determining whether the first disk key candidate acquired by said second acquisition means coincides with the second disk key candidate acquired by said third acquisition means; and decision means for deciding the first disk key candidate as the disk key when said determination means determines that the first disk key candidate coincides with the second disk key candidate.

3. An apparatus according to claim 1, wherein the multimedia data is audio data compressed in accordance with MPEG standards.

4. An apparatus according to claim 1, further comprising decoding means for decoding the multimedia data, decrypted by said fourth decryption means, in accordance with MPEG rules.

5. A copy protection apparatus comprising:

an encryption system; and a decryption system connected to said encryption system via a CPU bus, wherein said encryption system comprises first encryption means for encrypting, using a shared encryption key shared by said encryption system and said decryption system, an encrypted disk key encrypted using a disk key itself, first transmission means for transmitting, via the CPU bus, the disk key encrypted by said first encryption means, second encryption means for encrypting, using the shared encryption key, the encrypted disk key encrypted using the master key, second transmission means for transmitting, via the CPU bus, the disk key encrypted by said second encryption means, third transmission means for transmitting, via the CPU bus, the multimedia data which is decrypted by the disk key and in which electronic watermark information serving as some of the master keys is embedded, and fourth transmission means for transmitting the multimedia data encrypted using the disk key and the watermark information, and said decryption system comprises first decryption means for decrypting, using the shared encryption key, the disk key transmitted from said first transmission means, second decryption means for decrypting, using the shared encryption key, the disk key transmitted from said second transmission means, disk key acquisition means for acquiring the disk key on the basis of the disk key decrypted by said first decryption means, the disk key decrypted by said second decryption means, the watermark information extracted by said extraction means, and a part master key corresponding to some of the master keys, third decryption means for decrypting, using the disk key acquired by said disk key acquisition means, the multimedia data transmitted from said third transmission means, extraction means for extracting the electronic watermark information from the multimedia data decrypted by said third decryption means, and fourth decryption means for decrypting the multimedia data from said fourth transmission means on the basis of the electronic watermark information extracted by said extraction means and the disk key acquired by said disk key acquisition means.

6. An apparatus according to claim 5, wherein the multimedia data is audio data compressed in accordance with MPEG standards.

7. An apparatus according to claim 5, further comprising decoding means for decoding the multimedia data, decrypted by said fourth decryption means, in accordance with MPEG rules.

8. A copy protection apparatus comprising:

an encryption system; and a decryption system connected to said encryption system via a CPU bus, wherein said encryption system comprises first encryption means for encrypting, using a shared encryption key shared by said encryption system and said decryption system, an encrypted disk key encrypted using a disk key itself, first transmission means for transmitting, via the CPU bus, the disk key encrypted by said first encryption means, second encryption means for encrypting, using the shared encryption key, the encrypted disk key encrypted using the master key, second transmission means for transmitting, via the CPU bus, the disk key encrypted by said second encryption means, third transmission means for transmitting, via the CPU bus, the multimedia data which is decrypted by the disk key and in which electronic watermark information serving as some of the master keys is embedded, and fourth transmission means for transmitting, via the CPU bus, the multimedia data which is encrypted by the disk key and on which the electronic watermark information is superposed, and said decryption system comprises first decryption means for decrypting, using the shared encryption key, the disk key transmitted from said first transmission means, second decryption means for decrypting, using the shared encryption key, the disk key transmitted from said second transmission means, disk key acquisition means for acquiring the disk key on the basis of the disk key decrypted by said first decryption means, the disk key decrypted by said second decryption means, the watermark information extracted by said extraction means, and a part master key corresponding to some of the master keys, third decryption means for decrypting, using the disk key acquired by said disk key acquisition means, the multimedia data transmitted from said third transmission means, extraction means for extracting the electronic watermark information from the multimedia data decrypted by said third decryption means, fourth decryption means for decrypting, using the disk key acquired by said disk key acquisition means, the multimedia data transmitted from said fourth transmission means, and fifth decryption means for decrypting, using the electronic watermark information extracted by said extraction means, the multimedia data decrypted by said fourth decryption means.

9. An apparatus according to claim 8, wherein the multimedia data is audio data compressed in accordance with MPEG standards.

10. An apparatus according to claim 8, further comprising decoding means for decoding the multimedia data, decrypted by said fourth decryption means, in accordance with MPEG rules.

* * * * *